(12) United States Patent
Tamura et al.

(10) Patent No.: US 8,838,009 B2
(45) Date of Patent: Sep. 16, 2014

(54) ROLLER MECHANISM WITH SUPPORT MEMBER AND IMAGE FORMING APPARATUS HAVING THE ROLLER

(75) Inventors: Hitoshi Tamura, Hachioji (JP); Masaaki Uchiyama, Hachioji (JP)

(73) Assignee: Konica Minolta, Inc., Tokyo (JP)

( * ) Notice: Subject to any disclaimer, the term of this patent is extended or adjusted under 35 U.S.C. 154(b) by 482 days.

(21) Appl. No.: 11/802,859

(22) Filed: May 25, 2007

(65) Prior Publication Data

US 2008/0199116 A1  Aug. 21, 2008

(30) Foreign Application Priority Data

Feb. 19, 2007  (JP) ................................. 2007-037671

(51) Int. Cl.
  *G03G 15/00* (2006.01)
  *F16C 13/02* (2006.01)

(52) U.S. Cl.
  CPC ............ *F16C 13/02* (2013.01); *G03G 15/6529* (2013.01)
  USPC ...................................................... 399/388

(58) Field of Classification Search
  USPC .................. 384/569, 296, 290, 276, 231, 95; 399/388
  See application file for complete search history.

(56) References Cited

U.S. PATENT DOCUMENTS

| | | | |
|---|---|---|---|
| 5,805,958 A | * | 9/1998 | Fisk ................................ 399/98 |
| 6,375,577 B1 | * | 4/2002 | Smith et al. ................... 464/136 |
| 6,390,683 B1 | * | 5/2002 | Hirose et al. .................. 384/476 |
| 2005/0025523 A1 | * | 2/2005 | Iwasaki et al. ................ 399/167 |

FOREIGN PATENT DOCUMENTS

| | | |
|---|---|---|
| JP | 61-163261 | 10/1986 |
| JP | 2-122217 | 10/1990 |
| JP | 06-329295 | 11/1994 |
| JP | 08-105519 | 4/1996 |
| JP | 2002-213471 | 7/2002 |
| JP | 2003-246488 | 9/2003 |

OTHER PUBLICATIONS

Class V (Shaft-Hole) Tolerance Chart, http://www.engineersedge.com/class_v.htm.*
Japanese Office Action dated Jan. 6, 2009.

* cited by examiner

*Primary Examiner* — Matthew G Marini
(74) *Attorney, Agent, or Firm* — Holtz, Holtz, Goodman & Chick PC

(57) ABSTRACT

A roller mechanism includes a roller and a support member that supports the rotation shaft. Herein, the support member includes a bearing having an outer ring and inner ring which rotate relatively to each other, and a sleeve that is fittingly fixed to the inner ring, wherein the sleeve and rotation shaft are fitted to each other by clearance fitting and further engaged with each other with respect to a rotation direction.

12 Claims, 4 Drawing Sheets

← TOP VIEW

← CROSS-SECTIONAL VIEW

← FRONT VIEW

← CROSS-SECTIONAL VIEW

ROLLER MECHANISM WITH SUPPORT MEMBER AND IMAGE FORMING APPARATUS HAVING THE ROLLER

This application is based on Japanese Patent Application No. 2007-037671 filed on Feb. 19, 2007, in Japanese Patent Office, the entire content of which is hereby incorporated by reference.

FIELD OF THE INVENTION

The present invention relates to a roller and an image forming apparatus provided with the roller, wherein the roller has a support member that supports a rotation shaft such that the rotation shaft and the support member are fitted to each other by clearance fitting.

BACKGROUND OF THE INVENTION

Generally, as the support members of rotation shafts of devices, apparatuses, etc., often used are bearings of which the outer ring and the inner ring are relatively rotatable. As the above bearings, so-called rolling bearings, such as ball bearings, roller bearings, and needle bearings are widely known, for example.

Generally, in business machines and image forming apparatuses, a rotation shaft of each roller which conveys printing sheets is arranged between a pair of frames, panels, etc., and the ends of the rotation shaft of the roller is supported by bearings attached to the frames, panels, etc., for example, by ball bearings. The rotation shaft is supported by fitting it at the ends thereof to the inner rings of the bearings. For this fitting between the rotation shaft and the inner rings of the bearings, clearance fitting is often applied because of the easiness of assembly, replacement at the time of maintenance, and the like.

However, clearance fitting causes rotational slippage between the rotation shaft and the inner rings, and shaft scraping occurs at the fitting portions of the rotation shaft and the inner rings. This causes problems of making the rotation of the rotation shaft unstable, lowering the durability, etc. These problems tend to occur when the rotation shaft is accelerated/decelerated or the rotation direction is changed while the rotation shaft is rotated by a driving unit.

FIG. 2 shows an example of a support member of a rotation shaft in a prior art. With the support member of the rotation shaft in a prior art, shown in FIG. 2, the rotation shaft 501a of a roller 501 is supported by fitting that is clearance fitting to the inner rings 601a of respective ball bearings 601 supported by panels 701. The positioning rings 603 and 503 define the positions, with respect to the axial direction, of the ball bearings 601 and the roller 501. C rings, E rings, or the like, which are generally known, can be employed as the above described positioning rings 603 and 503.

In the above described support structures in a prior art, for example, when the diameter of the rotation shaft 501a is set to φ8 and a 0-grade ball bearing in accordance with JIS B1514 standard is used for the ball bearing 601, the inner diameter of the inner ring 601a of the ball bearing 601 is φ8 [0/−0.008]. This description of [0/−0.008] represents a tolerance, wherein 0 represents the upper tolerant dimension and −0.008 represents the lower tolerant dimension. The description below is made likewise. Herein, as an example, by setting the shaft diameter of the rotation shaft 501a to φ8 [−0.01/−0.03], the gaps at the above described fitting portions become into a range from 0.01 to 0.03, which allows clearance fitting. However, as described above, acceleration/deceleration or change of rotation direction of the roller 501 causes a problem of rotation slippage between the rotation shaft 501a and the inner ring 601a due to the gap, described above, and accordingly the rotation shaft 501a and inner ring 601a are scraped. This causes problems, such as, making the rotation of the roller 510 unstable and lowering the durability.

A bearing formed in a non-circular shape is disclosed (for example, refer to Patent Document 1: Japanese Utility Model Application Publication JITSUKAI-HEI No. H02-122217), which prevents the fitting portions of an inner ring and a rotation shaft inserted into the inner ring, or the fitting portions of an outer ring and a housing into which the outer ring is inserted, from rotation slippage, as the problem described above.

Further, there are disclosed structures for attaching a bearing to which clearance fitting is applied for fitting between the inner ring thereof and a rotation shaft, as follows. A groove, which penetrates along the axial direction, is formed at, at least, one portion of either the inner ring or the rotation shaft, and a recession is provided at a part of the surface of the other one, the position of this part corresponding to the groove, so as to hold a rolling body such that the groove and the rolling body held by the recession engage with each other along the circumferential direction (for example, refer to Patent Document 2: Japanese Patent Application Publication TOKKAI No. 2002-213471).

Patent Document 1 discloses a technology which, for example, forms a protrusion from the inner ring of a bearing and a groove on the surface of a rotation shaft to be fitted to the protrusion so as to prevent rotation slippage, by the fitting between the protrusion and the groove. However, since it is necessary to machine the above-mentioned inner ring and a commercially available bearing cannot be used as it is, it increases the cost. Further, for maintenance in the field, it is necessary to use dedicated bearings, and the maintainability decreases.

Patent Document 2 discloses a technology which forms a groove on either an inner ring or a rotation shaft, the groove penetrating along the axial direction, and forms a recession at a part of the surface of the other one, the part corresponding to the groove, so as to hold a rolling body such that the groove and the rolling body held by the recession engage with each other along the circumferential direction, thereby preventing rotational slippage and smoothing the motion along the axial direction. However, the same as the technology disclosed in Patent Document 1, it is necessary to machine the inner ring, which increases the cost, and to use a dedicated bearing, which decreases the maintainability.

Taking into account a problem, as described above, an object of the present invention is to provide an image forming apparatus that allows easy assembling and maintenance and is provided with a roller having a support member that prevents rotational slippage between the inner ring of a bearing and a rotation shaft, without an increase in cost.

SUMMARY OF THE INVENTION

To attain an object, as described above, the invention includes the following structures.

(1) A roller, comprising:
a rotation shaft; and
a support member that supports the rotation shaft, wherein the support member includes:
a bearing having an outer ring and inner ring which rotate relatively to each other; and a sleeve that is fittingly fixed to the inner ring, and wherein the sleeve and rotation shaft are fitted to each other by clearance fitting and further engaged with each other with respect to a rotation direction.

(2) An image forming apparatus that forms an image on a sheet, comprising:

a roller that conveys a sheet; and an image forming section, wherein the roller includes:

a rotation shaft; and a support member that supports the rotation shaft, the support member including:

a bearing having an outer ring and inner ring which rotate relatively to each other; and a sleeve that is fittingly fixed to the inner ring, and wherein the sleeve and rotation shaft are fitted to each other by clearance fitting and further engaged with each other with respect to a rotation direction.

BRIEF DESCRIPTION OF THE DRAWINGS

FIGS. 3a and 3b show another embodiment of a support member of a rotation shaft in accordance with the present invention;

FIG. 3c is a side view of a sleeve 612, viewed from the arrow direction Xb in FIG. 3a.

DETAILED DESCRIPTION OF THE PREFERRED EMBODIMENTS

Figure 1:
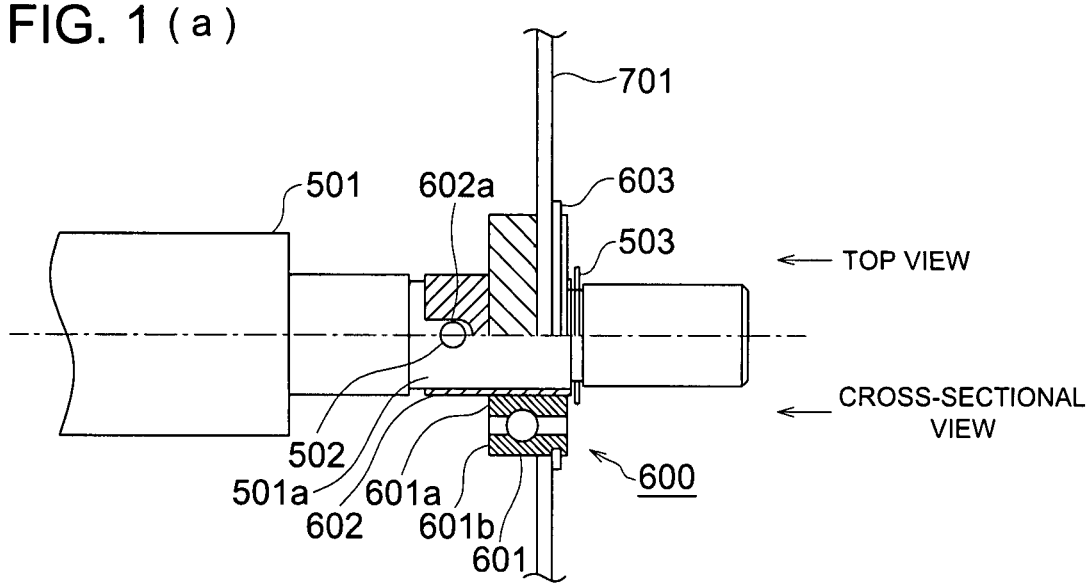
FIGS. 1a and 1b show a support member of a rotation shaft in accordance with the present invention.
Figure 1:
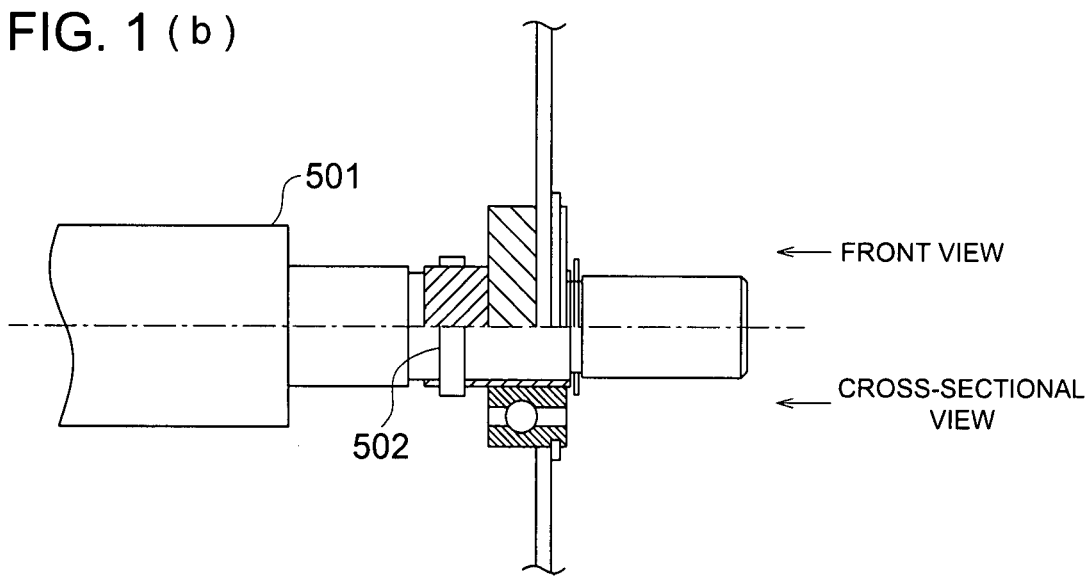
Figure 2:
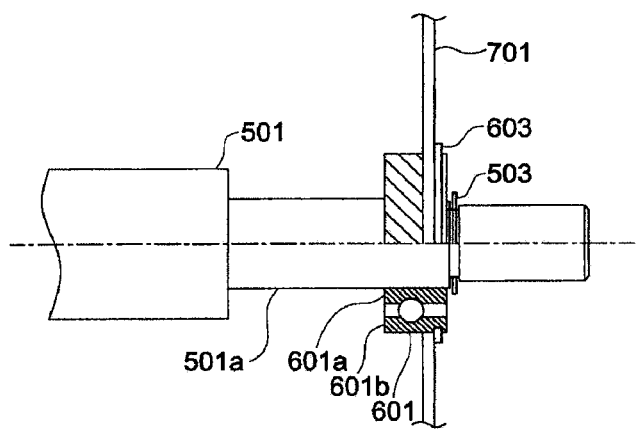
FIG. 2 shows an example of a support member of a rotation shaft in a prior art.

An embodiment of the present invention will be described below, referring to the drawings. However, the invention is not limited thereto.

FIGS. 1a and 1b show a support member of a rotation shaft in accordance with the present invention. FIG. 1a is a half-cross-sectional top view, and FIG. 1b is a half-cross-sectional front view.

The support member of the rotation shaft in accordance with the present invention, shown in FIGS. 1a and 1b, is constituted with a sleeve 602 formed with a tube member and a ball nearing 601. The sleeve 602 is pressure-inserted into an inner ring 601a of the ball bearing 601 and fittingly fixed. The sleeve 602 and inner ring 601a can be considered to be an integrated pseudo-inner ring. The sleeve 602 is provided with a fitting recession 602a in a U-shape to be fitted to a protruding member 502 provided on a rotation shaft 501a of a roller 501, described later. The rotation shaft 501a is provided with a protruding member 502 to be fitted to the fitting recession 602a. In the present embodiment, a spring pin is pressure-fitted into the rotation shaft 501a to form the protruding member 502. The protruding member 502 is not limited to the spring pin, and parallel pins may be pressure-fitted, for example.

An outer ring 601b of the ball bearing 601 is attached to a panel 701.

The rotation shaft 501a of the roller 501 is clearance-fitted to the sleeve 602. In the course of this fitting, the fitting recession 602a and protruding member 502 get fitted to each other. Thus, the rotation shaft 501a and sleeve 602 are engaged each other. Position definitions of the ball bearing 601 and the rotation shaft 501 of the roller 501 with respect to the axis direction are performed respectively by position defining rings 603 and 503. As the position defining rings 603 and 503, commonly known C-rings, E-rings or the like can be employed.

In such a manner, since a commercially available standard bearing can be used as it is without additional machining, the cost is not increased. Further, the assembly task and maintenance task can be easily performed. Still further, it is possible to support a roller 501, causing no rotational slippage between the inner ring 601a of the ball bearing 601 and the rotation shaft 501a. Thus, it is possible to prevent shaft scraping at the fitting portions of the rotation shaft 501a and inner ring 601a, instability of the rotation of the rotation shaft, and drop in durability.

Regarding the above-described clearance fitting at the support member of the rotation shaft in accordance with the invention, the gap between the rotation shaft 501a and the inner diameter of the sleeve 602 is preferably in a range of 0.02 mm to 0.07 mm. When the gap is smaller than 0.02 mm, fitting between the inner ring 601a and rotation shaft 501a may not be smooth enough. When the gap is larger than 0.07 mm, fluctuation of the roller 501 may become large in the radial direction, which may cause vibration or drop in the position accuracy of the roller 501.

Figure 3:
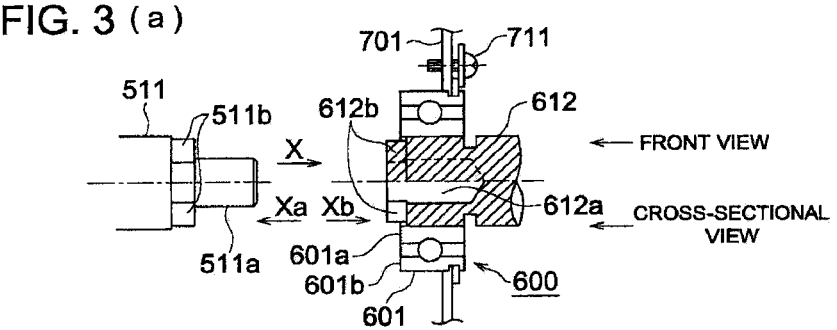
Figure 3:
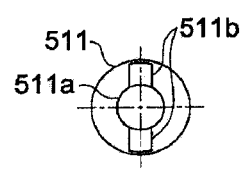
Figure 3:
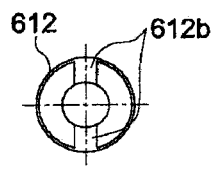

FIGS. 3a and 3b show another embodiment of engagement between a rotation shaft and sleeve. FIG. 3a shows the state before a rotation shaft 511a of a roller 501 is fitted to a sleeve 612. FIG. 3b is a side view of the roller 511, viewed from the arrow direction Xa. FIG. 3c is a side view of the sleeve 612, viewed from the arrow direction Xb. The sleeve 612 is formed with a solid shaft having a hollow section 612a.

The sleeve 612 is pressure-inserted into the inner ring 601a of a ball bearing 601, and fittingly fixed. The sleeve 612 is provided with a hollow section 612a to be fitted to the end portion of the rotation shaft 511a of a roller 511, described later, and provided with fitting recessions 612b to be fitted to protruding members 511b. The rotation shaft 511a of the roller 511 is provided with the protruding members 511b.

The roller 511 is moved in arrow X direction, and the rotation shaft 511a is fittingly supported by clearance fitting to the hollow section 612a of the sleeve 612 that is fittingly fixed to the inner ring 601a of the ball bearing 601 supported by a panel 701. In the course of this fitting, the protruding sections 511b and fitting recessions 612b get fitted to each other. In such a manner, the roller 511 and the sleeve 612 are engaged with each other. That is, the roller 611 and the inner ring 601a are engaged with each other.

Figure 4:
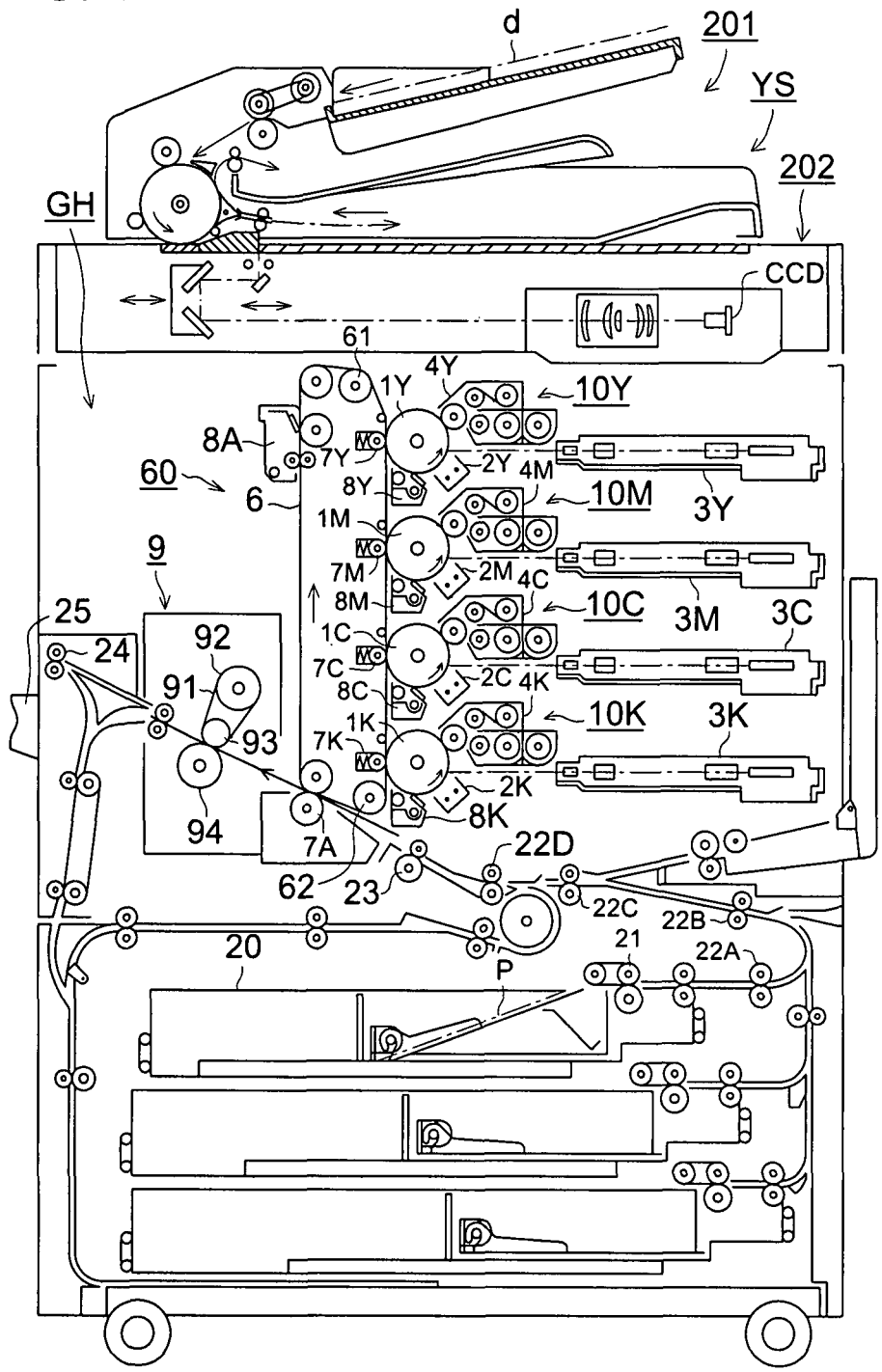
FIG. 4 shows an image forming apparatus to which a support member of a rotation shaft in accordance with the present invention is applied.

FIG. 4 shows an example of an image forming apparatus to which a support member of a rotation shaft in accordance with the invention is applied.

The image forming apparatus is constructed with an image forming apparatus main body GH and image reading device YS. The image forming apparatus main body GH is one that is called a tandem type color image forming apparatus having a plurality of image forming sections 10Y, 10M, 10C and 10K, a transfer unit 60 provided with an intermediate transfer body 6 in an endless belt form, a sheet conveying members, a fixing device 9, and the like.

The image reading device YS is installed on the top of the image recording apparatus main body GH, the image reading device YS being constructed with an automatic original document feeding device 201 and scanning exposure device 202. An original document d loaded on the original document table of the automatic original document feeding device 201 is conveyed by conveying means, an image/images on a single side or both sides of the original document are scanning-exposed by an optical system of the scanning exposure unit 202 and read by a line image sensor CCD.

The image data read by the line image sensor CCD is subjected in an image processing section to analog processing, A/D conversion, shading adjustment, and image compression processing, and then transmitted to exposure devices 3Y, 3M, 3C and 3K.

An image forming section 10Y, which forms an image in yellow (Y) color, has a charging device 2Y, exposure device 3Y, developing device 4Y and cleaning section 8Y arranged around a photoreceptor drum 1Y. An image forming section 10M, which forms an image in magenta (M) color, has a charging device 2M, exposure device 3M, developing device 4M and cleaning section 8M arranged around a photoreceptor drum 1M. An image forming section 10C, which forms an image in cyan (C) color, has a charging device 2C, exposure device 3C, developing device 4C and cleaning section 8C arranged around a photoreceptor drum 1C. An image forming section 10K, which forms an image in black (Bk) color, has a charging device 2K, exposure device 3K, developing device 4K and cleaning section 8K arranged around a photoreceptor drum 1K. Latent images are formed by the charging device 2Y and exposure device 3Y, charging device 2M and exposure device 3M, charging device 2C and exposure device 3C, and charging device 2K and exposure device 3K.

Herein, the developing devices 4Y, 4M, 4C and 4K contain a 2-component developing agent of toner and carrier in a small diameter for the colors of yellow (Y), magenta (M), cyan (C) and black (Bk).

The intermediate transfer body 6 is rotatably supported by a plurality of rollers, around the rollers.

The fixing device 9 is provided with the first pressing roller 93 having an elastic layer on a core metal, heating roller 92 having a heating source inside, fixing belt 91 in an endless form and tension-supported between the first pressing roller 93 and heating roller 92, the second pressing roller 94 that is in press-contact with the fixing belt 91 at the position facing the first pressing roller 93 and forms a fixing nip section. When a sheet P carrying an unfixed image passes the fixing nip section, unfixed toner is fixed on the sheet P with a heat and pressure.

Thus, images in the respective colors formed by the image forming sections 10Y, 10M, 10C and 10K are sequentially superimposed on the rotating intermediate transfer body 6 to be primarily transferred so that a color image in a combination of the images in the respective colors is formed. A sheet P stored in a sheet feeding cassette 20 is fed by a sheet feeding roller 21, then conveyed through conveying rollers 22A, 22B, 22C, and 22D, registration roller 23 and the like, to a transfer roller 7A so as to secondarily transfer the color image onto the sheet P. The sheet P onto which the color image has been transferred is heated and pressed by the fixing device 9 so as to fix the color image on the sheet P. Then, the sheet P is sandwiched by ejection rollers 24 to be loaded onto a sheet ejection tray 25 outside the apparatus.

On the other hand, after the color image is transferred to the sheet P by the transfer roller A, remaining toner on the intermediate transfer body 6 having separated the sheet P therefrom with a curvature is removed by a cleaning section 8A.

A case of applying a support member of a rotation shaft in accordance with the invention to the image recording apparatus, described above, will be described below, taking an example of the registration roller 23. The registration roller 23 adjusts a skew of a sheet P fed by the sheet feeding roller 21 and feeds the sheet P in synchronization with a transfer timing. A driving motor, not shown, rotationally drives the registration roller 23 and repeats stopping, driving and acceleration/deceleration.

Figure 5:
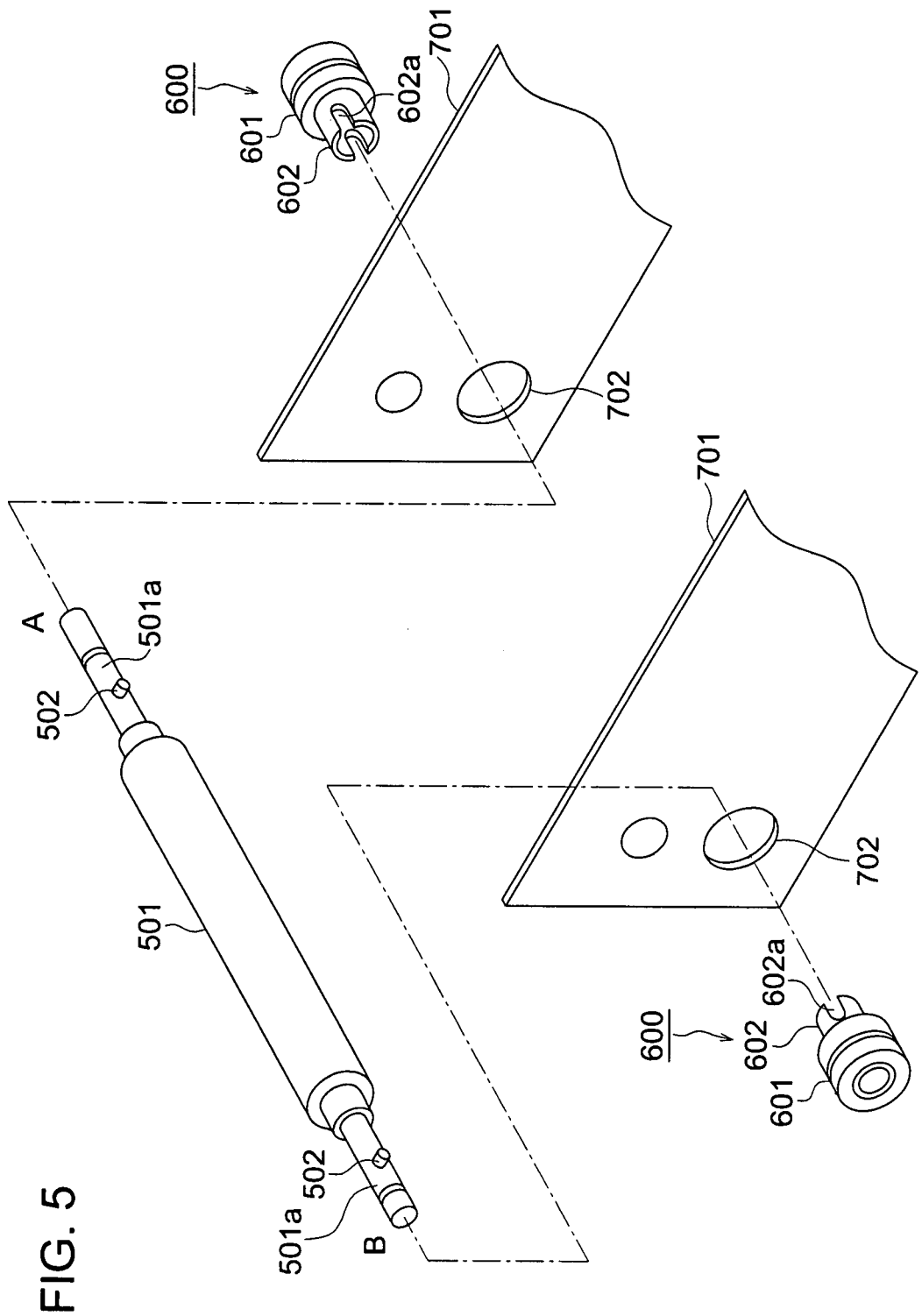
FIG. 5 is a partial view of the image forming apparatus to which the support member of the rotation shaft in accordance with the present invention is applied.

FIG. 5 is a partial view showing the above example. The support member of the rotation shaft, shown in FIG. 1, is used in the example. In FIG. 5, the registration roller 23 is referred to as a roller 501. The shape of the registration roller 23 is not limited to that of the roller 501, shown in FIG. 5.

The roller 501 is attached to a pair of panels 701. First, side A of the roller 501 is inserted into a bearing hole 702 of the panel 701, and then side B of the roller 501 is inserted into another bearing hole 702. Then, on the A and B sides of the roller 501, sleeves 602 fittingly fixed to the bearings 601 and a rotation shaft 501a are fitted to each other, and protruding members 502 and fitting recessions 602a are fitted to each other. Through the above fitting, the bearings 601 are inserted into the bearing holes 702 and attached to the panels 701. Fitting between the sleeves 602 and rotation shaft 501a, and the attaching of the bearings 601, may be performed first on either side A or side B of the roller 501. Next, the positions of the ball bearings 601 and roller 501 with respect to the axis direction are defined by the position defining rings 603 and 503.

An assembled unit to which the part, shown in FIG. 5, and other members are attached is then installed on the image forming apparatus.

In the example, shown in FIG. 5, side A of the roller 501 is connected to a driving motor, not shown, to be rotationally driven.

When taking off the roller 501 for maintenance or the like, a procedure in the reverse of the above assembling can be taken.

As has been described above, the sleeves 602 formed with tube members (or sleeves 612 formed with solid shafts) fittingly fixed by clearance fitting to the inner rings 601a of the bearings 601 and the rotation shaft 501a (or 511a) are fitted to each other by clearance fitting. Further, the sleeves 602 (or 612) are engaged with rotation shaft 501a (or 511a) with respect to the rotation direction. Accordingly, since commercially available standard bearings can be used as they are, without additional machining, the cost does not increase, and the tasks of assembly and maintenance can be easily carried out. Further, it is possible to support the rotation shaft 501a (or 511a), without causing rotational slippage between sleeves 602 formed with tube members (or sleeves 612 formed with solid shafts) and the rotation shaft 501a (or 511a). Thus, it is possible to prevent shaft scraping at the fitting portions of the rotation shaft 501a (or 511a) and the sleeves 602 formed with tube members (or sleeves 612 formed with solid shafts) being fittingly fixed to the inner rings 601a, thereby preventing instability of rotation of the rotation shaft 501a (or 511a) and drop in durability.

What is claimed is:

1. A roller mechanism, comprising:
    a roller that includes a rotation shaft that is driven; and
    a support member that is arranged to each end of the roller and supports the rotation shaft, wherein the support member includes:
        a bearing having an outer ring and inner ring which rotate relatively to each other; and
        a sleeve that is fittingly fixed to the inner ring,
    and wherein the sleeve and rotation shaft are fitted to each other by clearance fitting and further engaged with each other in a rotation direction, and
    wherein the sleeve and the rotation shaft are engaged with each other in the rotation direction by a protruding member which is fitted to a fitting recession provided on the sleeve and said protruding member is pole-shaped and is pressure-fitted into the rotation shaft perpendicularly to the rotation axis of the rotation shaft;

a gap between the rotation shaft and the sleeve is in a range of 0.02 mm to 0.07 mm, wherein outer rings of the bearings included in the support members arranged to both ends of the roller are attached respectively to a pair of panels of an apparatus with which the roller is attached, and each outer ring is fittingly fixed by clearance fitting to each panel.

2. The roller mechanism of claim 1, wherein the fittingly fixing of the sleeve is performed through press-insertion thereof into the inner ring.

3. The roller mechanism of claim 1, wherein the sleeve comprises a tube member.

4. The roller mechanism of claim 1, wherein the sleeve comprises a solid shaft having a hollow section.

5. An image forming apparatus that forms an image on a sheet, comprising:
   a roller mechanism of claim 1; and
   an image forming section that forms an image on a sheet conveyed by the roller mechanism.

6. The image forming apparatus of claim 5, wherein the roller includes a registration roller adjusts a skew of the sheet fed by a sheet feeding roller and feeds the sheet in synchronization with a transfer timing of the image onto the sheet.

7. A roller mechanism, comprising:
   a roller which includes a rotation shaft, the rotation shaft being driven by a driving device so as to rotationally driven; and
   a support member which supports the rotation shaft, the support member including:
   a bearing having an outer ring and an inner ring which are relatively rotatable; and
   a sleeve which is pressure-inserted into the inner ring of the bearing and fittingly fixed, and
   the rotation shaft of the roller is clearance fitted to the sleeve while being engaged with the sleeve in a rotation direction, and the outer ring of the bearing is attached to a panel of an apparatus with which the roller is attached; and
   the sleeve and rotation shaft are engaged with each other in the rotation direction by a protruding member which is fitted into a fitting recession provided on the sleeve, and said protruding member is pole-shaped and is pressure-fitted into the rotation shaft perpendicularly to the rotation axis of the rotation shaft.

8. An image forming apparatus that forms an image on a sheet comprising:
   a roller mechanism of claim 7; and
   an image forming section that forms an image on a sheet conveyed by the roller mechanism.

9. The image forming apparatus of claim 8, wherein the roller includes a registration roller adjusts a skew of the sheet fed by a sheet feeding roller and feeds the sheet in synchronization with a transfer timing of the image onto the sheet.

10. A roller mechanism, comprising:
    a roller which includes a rotation shaft, the rotation shaft being driven by a driving device so as to rotationally driven; and
    a support member which supports the rotation shaft, the support member including:
    a bearing having an outer ring and an inner ring which are relatively rotatable; and
    a sleeve which is pressure inserted into the inner ring of the bearing and fittingly fixed, and
    wherein the rotation shaft of the roller is clearance fitted to the sleeve while being engaged with the sleeve in a rotation direction by an engaging member;
    and wherein the sleeve and rotation shaft are engaged with each other in the rotation direction by a protruding member which is fitted to a fitting recession provided on the sleeve, and said protruding member is pole-shaped and is pressure-fitted into the rotation shaft perpendicularly to the rotation axis of the rotation shaft.

11. An image forming apparatus that forms an image on a sheet comprising:
    a roller mechanism of claim 10: and
    an image forming section that forms an image on a sheet conveyed by the roller mechanism.

12. The image forming apparatus of claim 11, wherein the roller includes a registration roller adjusts a skew of the sheet fed by a sheet feeding roller and feeds the sheet in synchronization with a transfer timing of the image onto the sheet.

* * * * *